United States Patent
Kaskari (10) Patent No.: US 11,853,884 B2
(45) Date of Patent: Dec. 26, 2023

(54) MANY OR ONE DETECTION CLASSIFICATION SYSTEMS AND METHODS

(71) Applicant: SYNAPTICS INCORPORATED, San Jose, CA (US)

(72) Inventor: Saeed Mosayyebpour Kaskari, Irvine, CA (US)

(73) Assignee: Synaptics Incorporated, San Jose, CA (US)

( * ) Notice: Subject to any disclaimer, the term of this patent is extended or adjusted under 35 U.S.C. 154(b) by 443 days.

(21) Appl. No.: 17/243,519

(22) Filed: Apr. 28, 2021

(65) Prior Publication Data

US 2021/0248470 A1   Aug. 12, 2021

Related U.S. Application Data (63) Continuation-in-part of application No. 16/724,025, filed on Dec. 20, 2019, now Pat. No. 11,080,600,
(Continued)

(51) Int. Cl.
  *G06N 3/08* (2023.01)
  *G10L 25/51* (2013.01)
  (Continued)

(52) U.S. Cl.
  CPC .............. *G06N 3/08* (2013.01); *G10L 15/063* (2013.01); *G10L 15/16* (2013.01); *G10L 15/22* (2013.01);
  (Continued)

(58) Field of Classification Search
  CPC .......... G06N 3/08; G06N 3/044; G06N 3/084; G10L 15/063; G10L 15/16; G10L 15/22;
  (Continued)

(56) References Cited

U.S. PATENT DOCUMENTS 5,155,763 A * 10/1992 Bigus .................. H04M 3/5158
                                                  379/112.01
5,583,961 A   12/1996 Pawlewski
(Continued)

OTHER PUBLICATIONS

Rose et al., "A Hidden Markov Model Based Keyword Recognition System," Proc. of ICASSP, 1990, pp. 129-132, IEEE.
(Continued)

*Primary Examiner* — Michael Colucci
(74) *Attorney, Agent, or Firm* — Paradice & Li LLP (57) ABSTRACT

A classification training system comprises a neural network configured to perform classification of input data, a training dataset including pre-segmented, labeled training samples, and a classification training module configured to train the neural network using the training dataset. The classification training module includes a forward pass processing module, and a backward pass processing module. The backward pass processing module is configured to determine whether a current frame is in a region of target (ROT), determine ROT information such as beginning and length of the ROT and update weights and biases using a cross-entropy cost function and a tunable many-or-one detection (MOOD) cost function, that comprises a tunable hyperparameter for tuning the classifier for a particular task. The backward pass module further computes a soft target value using ROT information and computes a signal output error using the soft target value and network output value.

20 Claims, 7 Drawing Sheets

Related U.S. Application Data which is a continuation-in-part of application No. 15/894,883, filed on Feb. 12, 2018, now Pat. No. 10,762,891.

(60) Provisional application No. 62/465,723, filed on Mar. 1, 2017, provisional application No. 62/457,663, filed on Feb. 10, 2017.

(51) Int. Cl.
*G10L 25/30* (2013.01)
*G10L 15/16* (2006.01)
*G10L 15/22* (2006.01)
*G10L 15/06* (2013.01)
*G10L 15/08* (2006.01)

(52) U.S. Cl.
CPC ............. *G10L 25/30* (2013.01); *G10L 25/51* (2013.01); *G10L 2015/088* (2013.01)

(58) Field of Classification Search
CPC ... G10L 25/30; G10L 25/51; G10L 2015/088; G10L 2015/025
See application file for complete search history.

(56) References Cited

U.S. PATENT DOCUMENTS

| | | | |
|---|---|---|---|
| 5,621,857 A | 4/1997 | Cole | |
| 5,630,023 A * | 5/1997 | Oteki | G06N 3/049 706/41 |
| 5,732,394 A | 3/1998 | Nakamura | |
| 5,749,066 A | 5/1998 | Nussbaum | |
| 5,812,974 A | 9/1998 | Hemphill | |
| 6,041,299 A * | 3/2000 | Schuster | G10L 15/16 706/42 |
| 6,470,261 B1 * | 10/2002 | Ng | G06V 20/54 340/901 |
| 6,615,382 B1 * | 9/2003 | Kang | H04L 1/1809 714/748 |
| 6,728,404 B1 | 4/2004 | Ono | |
| 7,110,526 B1 * | 9/2006 | Dezonno | H04Q 3/64 379/266.01 |
| 8,675,839 B1 * | 3/2014 | Noble, Jr. | H04M 3/5175 379/221.03 |
| 9,191,304 B1 * | 11/2015 | Plate | H04W 40/20 |
| 9,436,876 B1 | 9/2016 | Carlson | |
| 9,466,292 B1 | 10/2016 | Lei | |
| 9,723,144 B1 * | 8/2017 | Gao | H04M 3/5238 |
| 9,792,897 B1 | 10/2017 | Kaskari | |
| 10,013,640 B1 * | 7/2018 | Angelova | G06V 10/454 |
| 10,114,554 B1 * | 10/2018 | Gonzalez | H03M 7/30 |
| 10,229,672 B1 | 3/2019 | Rao | |
| 10,388,272 B1 | 8/2019 | Thomson | |
| 10,522,134 B1 | 12/2019 | Matsoukas | |
| 10,762,891 B2 | 9/2020 | Kaskari et al. | |
| 2003/0115041 A1 * | 6/2003 | Chen | G10L 19/002 704/E19.01 |
| 2003/0225786 A1 * | 12/2003 | Hall | G06N 3/126 |
| 2005/0102531 A1 * | 5/2005 | Yang | H04L 69/22 726/26 |
| 2005/0216426 A1 * | 9/2005 | Weston | G09B 7/00 706/12 |
| 2005/0261898 A1 * | 11/2005 | Van Klinken | H04L 25/03019 704/219 |
| 2007/0160007 A1 * | 7/2007 | Wang | H04W 36/00837 455/405 |
| 2010/0004932 A1 | 1/2010 | Washio | |
| 2010/0198054 A1 * | 8/2010 | Ewing | A61B 5/7267 600/420 |
| 2011/0224975 A1 * | 9/2011 | Li | G10L 19/08 704/203 |
| 2012/0106835 A1 * | 5/2012 | Bernal | H04N 1/52 382/162 |
| 2013/0325768 A1 * | 12/2013 | Sinyavskiy | G06N 3/049 706/16 |
| 2015/0340032 A1 | 11/2015 | Grienstein | |
| 2015/0381809 A1 * | 12/2015 | Fleming | H04M 3/5158 379/265.11 |
| 2016/0048766 A1 * | 2/2016 | McMahon | G06Q 40/08 706/12 |
| 2017/0005644 A1 * | 1/2017 | Sayeh | H03M 3/30 |
| 2017/0083829 A1 * | 3/2017 | Kang | G06N 3/045 |
| 2017/0092298 A1 | 3/2017 | Nakamura et al. | |
| 2017/0133038 A1 | 5/2017 | Jiang | |
| 2017/0148431 A1 * | 5/2017 | Catanzaro | G10L 15/183 |
| 2017/0249551 A1 * | 8/2017 | Iljazi | G06N 3/10 |
| 2017/0263255 A1 | 9/2017 | Jeong | |
| 2017/0323643 A1 | 11/2017 | Arslan | |
| 2017/0344829 A1 * | 11/2017 | Lan | G06V 40/103 |
| 2017/0372197 A1 * | 12/2017 | Baughman | G06N 3/047 |
| 2018/0121800 A1 | 5/2018 | Kanda | |
| 2018/0203848 A1 * | 7/2018 | Perez | G10L 25/30 |
| 2018/0233130 A1 * | 8/2018 | Kaskari | G06N 3/044 |
| 2018/0253648 A1 * | 9/2018 | Kaskari | G06F 18/2413 |
| 2020/0250539 A1 | 8/2020 | Liu | |

OTHER PUBLICATIONS

Wöllmer et al., "Keyword spotting exploiting Long Short-Term Memory," Speech Communication, 2013, pp. 252-265, vol. 55, Elsevier.

Fernández, Santiago, et al., "An application of recurrent neural networks to discriminative keyword spotting," Proceedings of the 17$^{th}$ International Conference on Artificial Neural Networks (ICANN'07), Sep. 9-13, 2007, pp. 220-229, Porto, Portugal.

Graves, Alex, et al., "Connectionist Temporal Classification: Labelling Unsegmented Sequence Data with Recurrent Neural Networks," Proceedings of the 23$^{rd}$ International Conference on Machine Learning, 2006, pp. 369-376, Pittsburgh, Pennsylvania.

Graves, Alex, et al., "Towards End-to-End Speech Recognition with Recurrent Neural Networks," Proceedings of the 31$^{st}$ International Conference on Machine Learning, 2014, pp. 1764-1772, vol. 32, Beijing, China.

Graves, Alex, "Sequence Transduction with Recurrent Neural Networks," International Conference of Machine Learning 2012 Workshop on Representation Learning, Nov. 14, 2012, 10 Pages, arXiv:1211.3711.

Graves, Alex, et al., "Framewise Phoneme Classification with Bidirectional LSTM and Other Neural Network Architectures," Neural Networks, Jul.-Aug. 2005, vol. 18, Issues 5-6, pp. 602-610.

Hannun, Awni, et al., "Deep Speech: Scaling up end-to-end speech recognition," Dec. 19, 2014, 12 Pages, arXiv:1412.5567.

Hannun, Awni, et al., "First-Pass Large Vocabulary Continuous Speech Recognition using Bi-Directional Recurrent DNNs," Dec. 8, 2014, 7 Pages, arXiv:1408.2873.

Rabiner, L.R., "A Tutorial on Hidden Markov Models and Selected Applications in Speech Recognition," Proceedings of the IEEE, Feb. 1989, vol. 77, Issue 2, pp. 257-286.

Sak, Hasim, et al., "Learning Acoustic Frame Labeling for Speech Recognition with Recurrent Neural Networks," 2015 IEEE International Conference on Acoustics, Speech and Signal Processing (ICASSP), 2015, pp. 4280-4284.

Wöllmer, Martin, et al., "Bidirectional LSTM Networks for Context-Sensitive Keyword Detection in a Cognitive Virtual Agent Framework," Cognitive Computation, 2010, pp. 180-190, vol. 2, Issue 3, Springer-Verlag.

Wöllmer, Martin, et al., "Improving Keyword Spotting with a Tandem BLSTM-DBN Architecture," Proceedings of the 2009 International Conference on Advances in Nonlinear Speech Processing (NOLISP'09), Jun. 25-27, 2009, pp. 68-75, Vic, Spain.

Wöllmer, Martin, et al., "Spoken Term Detection with Connectionist Temporal Classification: a Novel Hybrid CTC-DBN Decoder," International Conference on Acoustics, Speech, and Signal Processing (ICASSP), Mar. 14-19, 2010, pp. 5274-5277, IEEE, Dallas, Texas.

(56) References Cited

OTHER PUBLICATIONS

Zeiler, Matthew D., "Adadelta: An Adaptive Learning Rate Method," CoRR, 2012, 6 Pages, arXiv:1212.5701.

* cited by examiner

FIG. 4
Forward Pass

FIG. 5
Backward pass

MANY OR ONE DETECTION CLASSIFICATION SYSTEMS AND METHODS

CROSS-REFERENCE TO RELATED APPLICATIONS

This application is a continuation-in-part of U.S. patent application Ser. No. 16/724,025, filed Dec. 20, 2019, titled "Recurrent Neural Network Based Acoustic Event Classification Using Complement Rule," which is incorporated herein by reference in its entirety.

U.S. patent application Ser. No. 16/724,025 is a continuation-in-part of U.S. patent application Ser. No. 15/894,883, filed Feb. 12, 2018 now U.S. Pat. No. 10,762,891 which issued Sep. 1, 2020, titled "Binary and Multi-Class Classification Systems and Methods Using Connectionist Temporal Classification," which claims the benefit of and priority to both U.S. Provisional Patent Application No. 62/457,663 filed Feb. 10, 2017 and entitled "Connectionist Temporal Classification (CTC) Network Using Cross-Entropy Cost Function for Binary Classification" and U.S. Provisional Patent Application No. 62/465,723 filed Mar. 1, 2017 and entitled "Recurrent Network For Connectionist Temporal Classification (CTC) Using Segmented Labeled Sequence Data," all of which are incorporated herein by reference in their entirety.

TECHNICAL FIELD

The present application relates generally to information classification, and more particularly, for example, to systems and methods for training event detection and classification models.

BACKGROUND

Activity detection and description is a key functionality of perceptually aware interfaces working in collaborative human communication environments like meeting-rooms or classrooms. In some systems, for example, the human activity is reflected in a rich variety of acoustic events, either produced by the human body or by objects handled by humans, so auditory scene analysis by computer may help to detect and describe human activity as well as to increase the robustness of automatic speech recognition and active noise cancelation systems. Audio activity detection and classification is also useful for automatic tagging in audio indexing, automatic sound analysis for audio segmentation, audio context classification, and other audio detection and classification tasks.

Acoustic event classification (AEC) is one of the problems considered by computational auditory scene analysis. Indeed, speech usually is the most informative acoustic event, but other kind of sounds may also carry useful information. For example, clapping or laughing inside a speech, coughing, sounds of animals, objects, nature, situations or a strong yawn in the middle of a lecture, or a chair moving or door noise when the meeting has just started. An audio context or scene may be characterized by the presence of individual sound events. In this respect, it is often desirable to manage a multi-class description of audio or video files by detecting the categories of sound events which occur in a file. For example, one may want to tag a holiday recording as being on the "beach", playing with the "children" and the "dog", right before the "storm" came. These are different level of annotations, and while the beach as a context could be inferred from acoustic events like waves, wind, and water splashing, the audio events "dog barking" or "children" may also be explicitly recognized, because such acoustic event may appear in other contexts, too.

Researchers have attempted to use information extracted from various sounds to enrich various applications, such as monitoring systems for elderly people or infants, automatic surveillance systems, automatic lifelogging systems, and advanced multimedia retrieval systems. The techniques used in these applications include acoustic scene analysis (ASA) that analyzes scenes in terms of the places, situations, and user activities they depict and acoustic event analysis (AEA) that analyzes various sounds, such as footsteps, the rumble of traffic, or a scream, for example.

In addition to AEC, there are other detection and classification problems such as image object detection, keyword spotting and speech activity detection. Many conventional approaches are highly complex and result in implementations that are not practical for use in applications with memory, power and processing limitations, such as applications running on mobile phones and other low power devices. Efforts to reduce complexity often come at the cost of less flexibility, memory inefficiencies, and other undesirable performance measures. In view of the foregoing, there is a continued need in the art for solutions to optimize information classification systems that are fast, accurate and resource efficient.

SUMMARY

The present disclosure provides systems and methods that address a need in the art for improved event classification. In some embodiments, a new cost function is proposed for training inference models to solve classification problems. The new cost function enforces the classifier to detect many or one detections and so it is referred to herein as a "Many or One Detection" (MOOD) cost function. A region of target (ROT) is defined as a region that will be considered for ground truth labeling for training data and the classifier is trained to detect the event of interest in that region. The MOOD cost function includes a hyperparameter, which is tuned to enforce the classifier to have a desired classification result, such as only a single-detection in the ROT, detections in all the duration or something in between depending on the hyperparameter tuning. The hyperparameter is used to adjust the cost function to different applications. For example, the applications in which single-detection or close to single detection is enough (e.g. keyword spotting) or in applications where we would like to have at least one detection (e.g. acoustic event detection).

In some embodiments, a method for training an event classifier includes receiving a training dataset including a plurality of input samples having segmented labeled data, computing a classifier output for each input sample of the training dataset in a forward pass through the classifier, tuning a many-or-one detection (MOOD) cost function using a hyperparameter in accordance with at least one event classifier goal, updating weights and biases of the classifier through a backward pass, including determining whether an input frame is in a Region of Target (ROT), and estimating the update of the weights and the biases of the classifier. The classifier is trained using the tuned MOOD cost function to cause the classifier to spike at least one time during a duration of the event.

In various embodiments of the method, the classifier is trained for phenome recognition using a multi-class classification and the method includes updating weights and biases through the backward pass through the classifier by computing a signal error for all output nodes using a cross-entropy cost function for non-ROT regions and wherein the classifier is further trained to compute a soft target for all the frames of the ROT. The method may further comprise finding ROT information, including a beginning and length of the ROT.

The hyperparameter may be tuned to enforce the classifier to generate a predetermined classification result. The hyperparameter is tuned to train the classifier to generate a single-detection in the ROT, generate detections in all of the ROT, and/or generate a plurality of detections in ROT.

In some embodiments, adaptively learning to improve a convergence rate comprises determining a momentum for the weights and biases of an output layer, and computing root mean square of gradients for weights and biases not in the output layer. The classifier may be trained for acoustic event detection by generating a spike when the acoustic event is detected, which may include calculating a signal output error for each classifier output based on the determination of whether the input frame is in the ROT and updating the weights and biases during a backward pass based on the calculated signal output error. The method may further include updating the weights and biases during the backward pass by applying a cross-entropy cost function if the input frame is not in the ROT. Calculating the signal output error for each output may comprise obtaining ROT information for the input frame, including a length and beginning of the ROT, computing a soft target value using the ROT information, and computing the signal output error using the computed soft target value and classifier output value.

In some embodiments, a classification training system comprises a neural network configured to classify audio input data, a training dataset providing segmented labeled audio training examples, and a classification training module configured to train the neural network using the segmented labeled training data, the classification training module comprising a forward pass processing module, and a backward pass processing module. In some embodiments, the forward pass processing module is configured to train the neural network by generating neural network outputs for the training data using a current value of weights and biases for the neural network; and the backward pass processing module is configured to train the neural network by updating the weights and biases by passing backward through generated neural network outputs, determining whether an input frame is in a Region of Target (ROT), tuning a many-or-one detection (MOOD) cost function for ROT frames, applying a MOOD cost function for the ROT frames and adaptively learning to improve a convergence rate of the neural network. The classification training system may be further configured to perform one or more of the methods disclosed herein.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. The included drawings are for illustrative purposes and serve only to provide examples of possible systems and methods for the disclosed methods and systems. These drawings in no way limit any changes in form and detail that may be made to that which is disclosed by one skilled in the art without departing from the spirit and scope of this disclosure.

DETAILED DESCRIPTION

In accordance with various embodiments of the present disclosure, improved systems and methods for event classification are disclosed. Event detection and classification used in many perceptually aware interfaces working in collaborative human communication environments (e.g., meeting-rooms or classrooms). Human activity may be reflected in a variety of events, such as acoustic events, produced by the human body or by objects handled and/or controlled by humans in the environment. In an audio context, auditory scene analysis of such activity by a computer processing system may be used to detect and describe human activity as well as to increase the robustness of automatic speech recognition and active noise cancelation systems. Auditory scene analysis may also be useful for automatic tagging in audio indexing, automatic sound analysis for audio segmentation, audio context classification and other audio detection and classification tasks.

Acoustic event classification (AEC) is often one of the features of a computational auditory scene analysis process. An audio context or scene may be characterized, for example, by the presence of individual sound events. Speech is often an informative acoustic event for analyzing human activity, but other types of sounds may also carry useful information including, for example, clapping or laughing inside a speech segment, a strong yawn in the middle of a lecture, coughing, sneezing, a chair moving or door noise when the meeting has just started, sounds of animals, objects, and nature, and/or other sounds associated with other situations/events.

Event classification systems and methods may also include visible image analysis, infrared image analysis, and/or other sensor data analysis, depending on the goals of the classification system.

Acoustic Event Classification

In various embodiments disclosed herein, systems and methods are configured to solve an acoustic event classification problem. It will be appreciated, however, that the methods disclosed herein can be applied to any classification problem, including object detection in image processing, and/or other types of data analysis (e.g., analysis of data from one or more sensors).

In some embodiments, a real-time acoustic event classification solution is provided that is suitable for many low power, low memory implementations. The embodiments disclosed herein may be implemented using a recurrent neural network such as Long Short-Term Memory (LSTM) to train an inference model to recognize an event in a continuous context. An improved cost function efficiently enforces the neural network to detect the event of interest. The cost function can be efficiently implemented in systems with computational and memory constraints. In some embodiments, a tunable many or one detection (MOOD) cost function is used to efficiently compute the probability of recognizing an event during the event duration. In some embodiments, the MOOD cost function is tunable via a tunable hyperparameter, allowing the classifier to be trained for desired acoustic event (e.g., generate a single detection of the acoustic event, generate a plurality of detections throughout the duration of an acoustic event, etc.).

Figure 1:
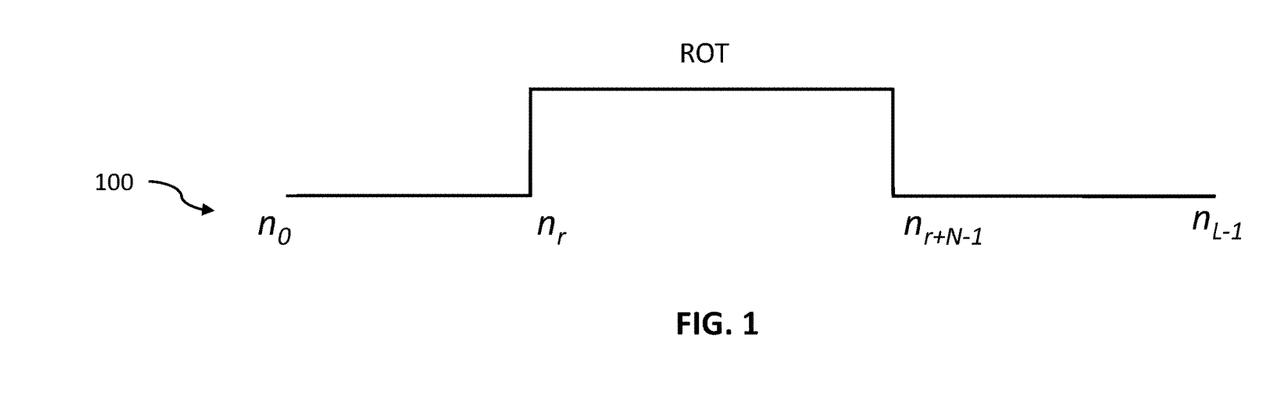
FIG. 1 illustrates example Region of Target (ROT) labeling with a sequence of input data, in accordance with one or more embodiments of the present disclosure.
Figure 2:
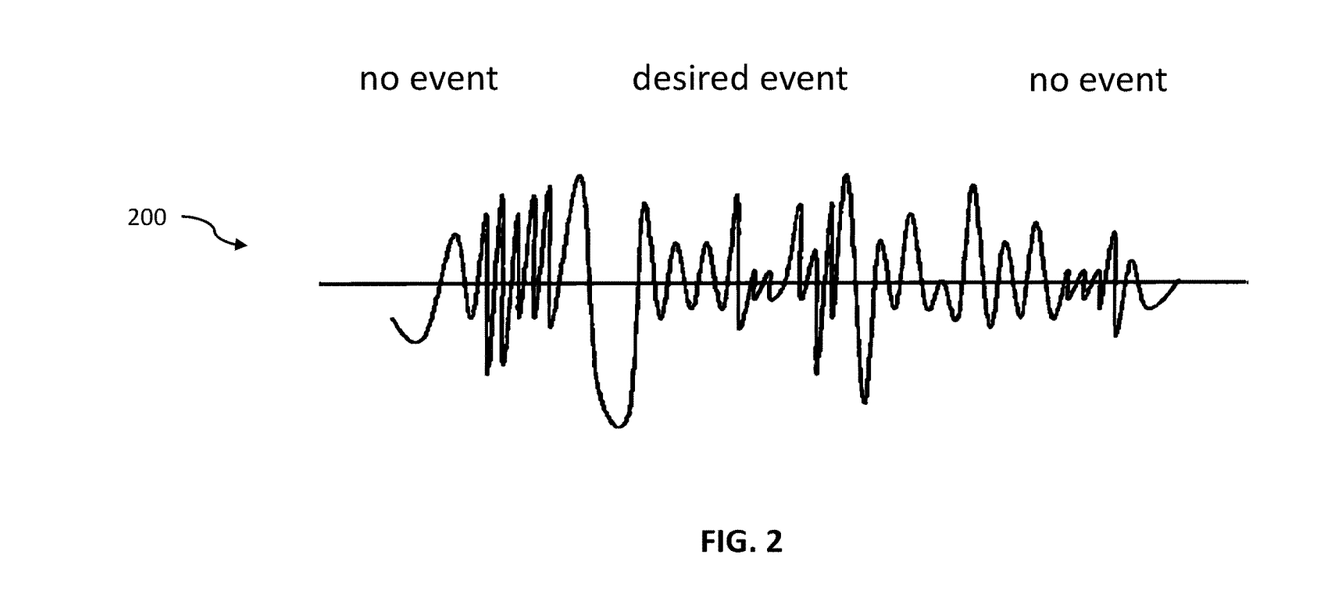
FIG. 2 illustrates an example waveform for an acoustic event, in accordance with one or more embodiments of the present disclosure.

In various embodiments, the acoustic event classification systems and methods disclosed herein classify events in a Region of Target (ROT). An example of ROT ground truth labelling for event classification is illustrated in FIGS. 1 and 2. As illustrated, an acoustic event to be detected may include the presence of a "desired event" in an audio sequence generated by an audio input system. An audio input system generates an input audio stream detected from an environment (e.g., an audio waveform 200) which is provided as an input to an audio processing system. The audio waveform is divided into a sequence of audio frames 100 (e.g., a sequence of frames in order from frame 0 to frame L−1, in an audio waveform with a length of L frames).

The region in which the event of interest occurs in the signal is called the ROT. An ROT is identified from frame $n_r$ to frame $n_{r+N-1}$ to encompass the acoustic event. In some embodiments, the ROT can be defined in a bigger region to include the neighbor frames before and after the event. Labeled training data including audio waveforms with labeled ROTs may be used to train one or more neural networks disclosed herein. As illustrated, the signal has length L which starts from frame $n_0$ to frame $n_{L-1}$. The desired event occurs from frame $n_r$ to frame $n_{r+N-1}$ with length N. The label values in the illustrated example indicate frames that have one value in the ROT for a desired event (e.g., a value of 1) and another value (e.g., a value of 0) for the remaining non-ROT frames which do not include the labeled event.

The systems and methods disclosed herein enable accurate ROT detection, which allows for increased processing efficiency and accuracy. The ROT labeling may include other audio event classifications such as labels to identify keywords, and corresponding start points and end points of ROTs. Other labeling may include audio contexts of interest such as clapping, laughing, coughing, animal sounds, sounds made by objects associated with the context and other audio data.

Figure 3:
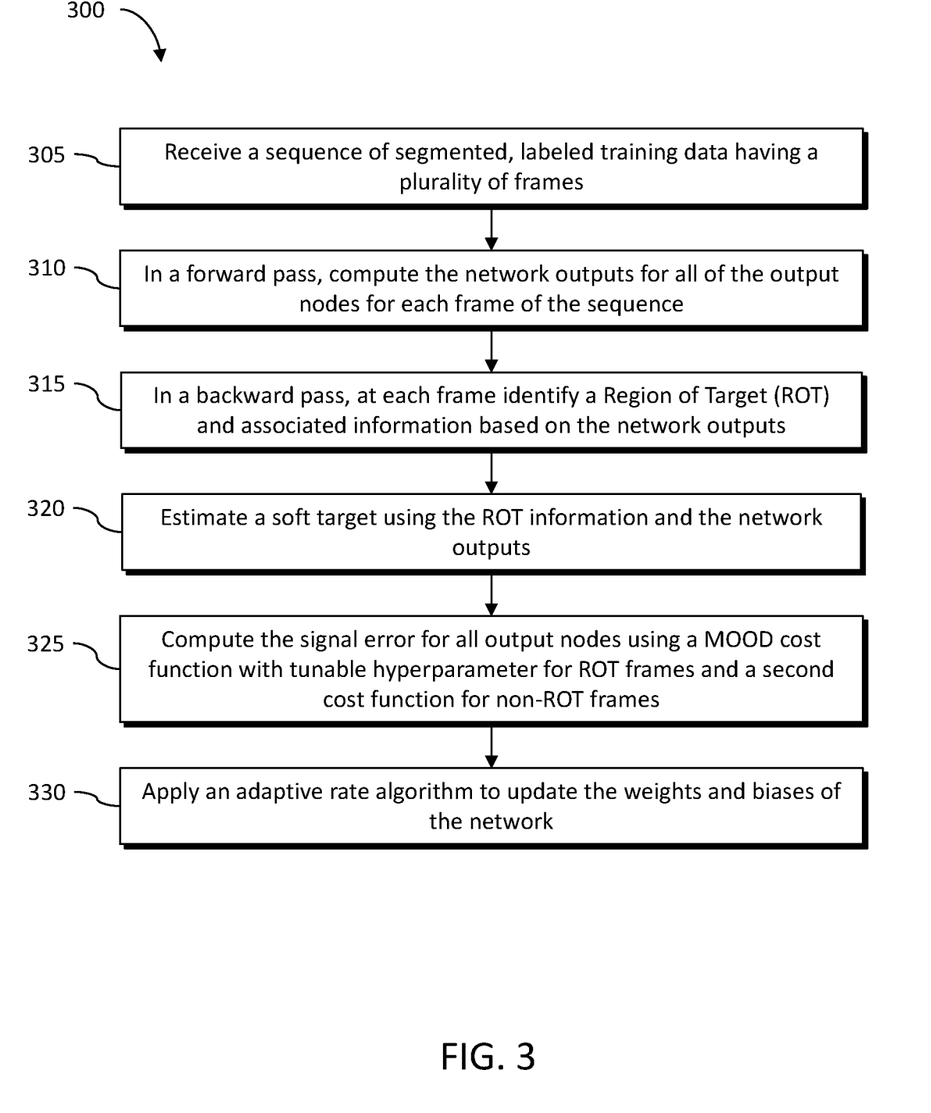
FIG. 3 is a flow diagram illustrating a process for training an event detection and classification system, in accordance with one or more embodiments of the present disclosure.
Figure 4:
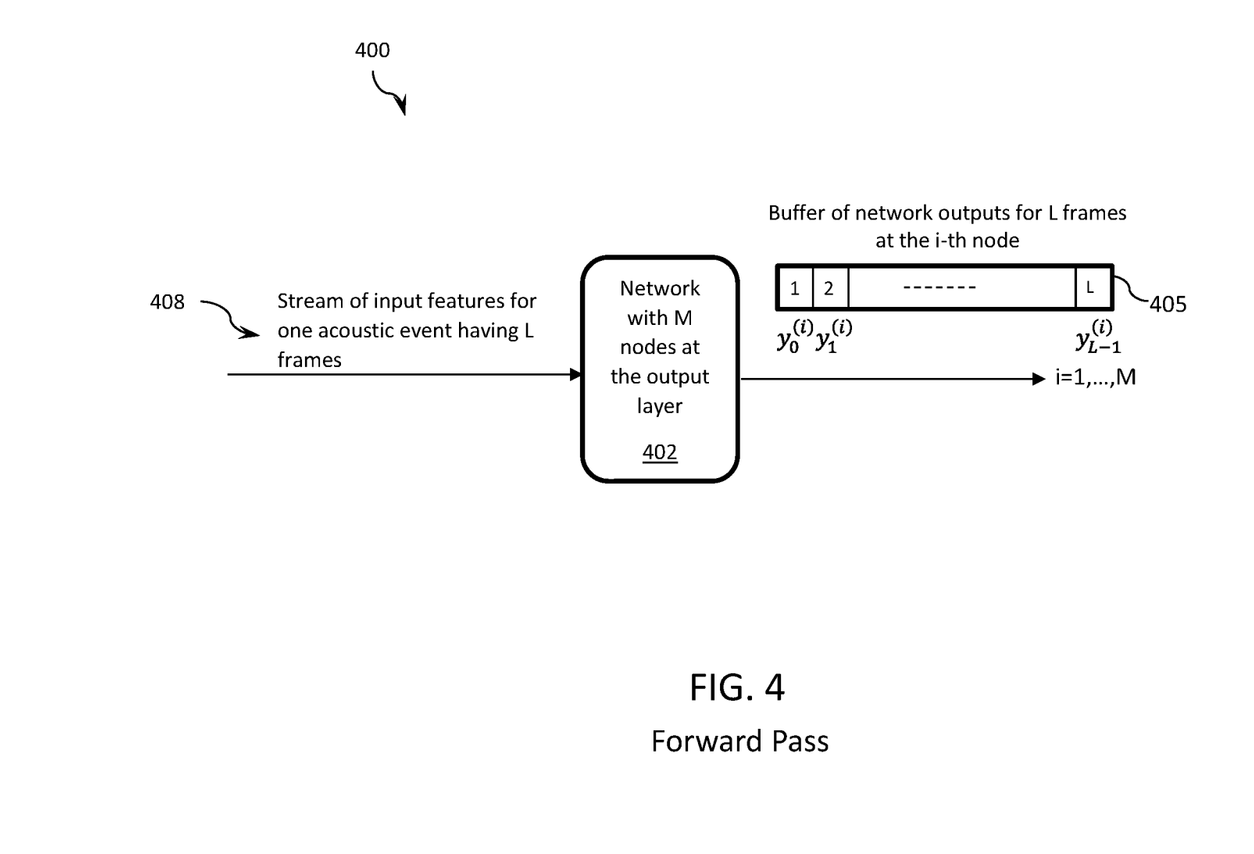
FIG. 4 is a block diagram illustrating an example forward pass process for training a classification system, in accordance with one or more embodiments of the present disclosure.

Referring to FIGS. 3-5, example embodiments of systems and methods for training a network for a classification application, such as acoustic event classification, will now be described. An inference model may be trained in accordance with the procedure 300 of FIG. 3 as further described below. In step 305, the system receives a sequence of segmented, labeled training data having a plurality of frames. In step 310, a forward pass of the data through the network is conducted, including computing network outputs for all of the output nodes for each frame of the sequence. An example forward pass procedure 400 is illustrated in FIG. 4, in which the network outputs for all of the output nodes ($y_n^{(i)}$, i=1, ..., M), for each frame of a sequence of training data 408, are computed, where M is the number of classes of acoustic events. In the illustrated embodiment, the output layer of the network comprises a sigmoid layer and the number of output nodes of the network correspond to the number of classes. The network outputs for all the frames of the sequence are stored in a buffer 405.

Next, in step 315, a backward pass through the network is conducted, including identifying at each frame a region of target and associated information based on the network outputs. In step 320, a soft target is estimated using the ROT information and the network outputs. Next, a signal error for all output nodes is computed (step 325) using a first cost function for ROT frames and a second cost function for non-ROT frames. In step 330, an adaptive rate algorithm is applied to update the weights and biases of the network. In some embodiments, the cost functions include a MOOD cost function with a tunable hyperparameter which may be set to train the classifier for a desired classification task.

Figure 5:
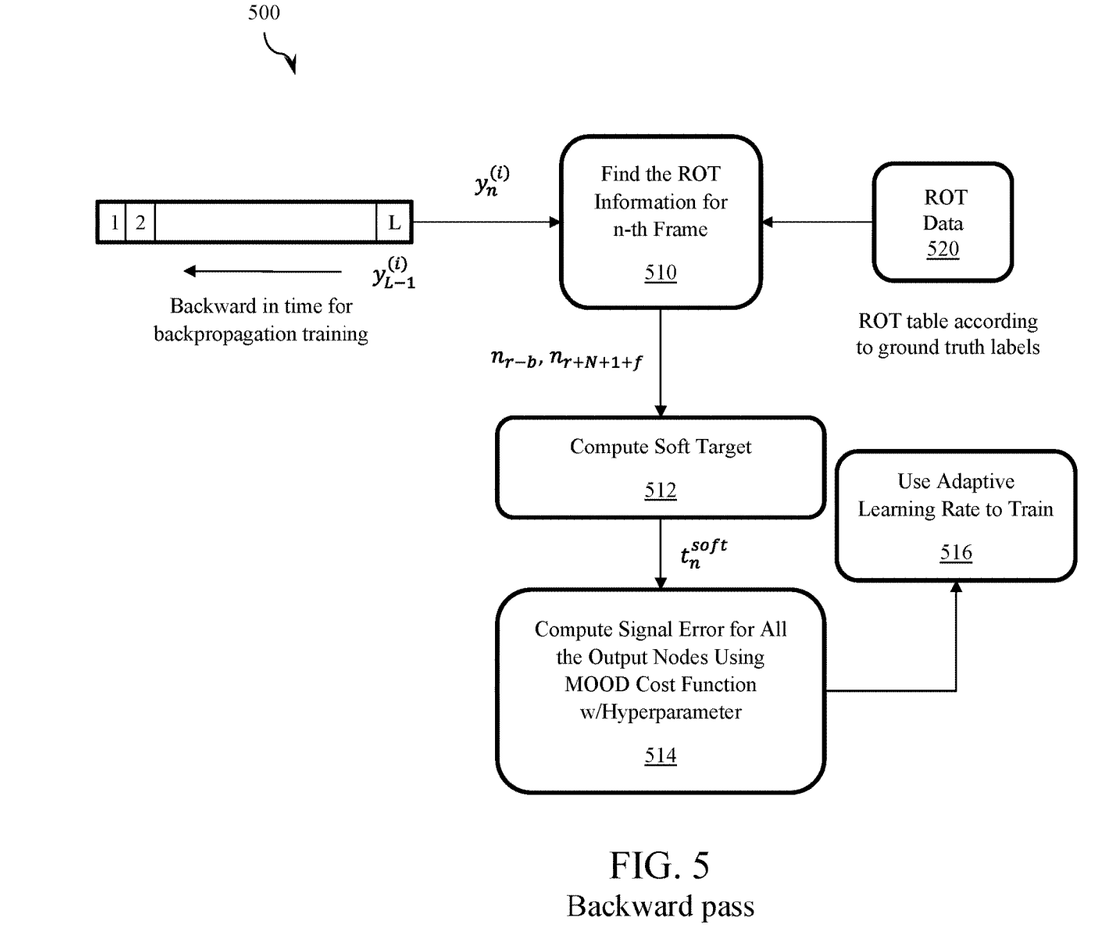
FIG. 5 is a block diagram illustrating an example backward pass process for training a classification system, in accordance with one or more embodiments of the present disclosure.

An example backward pass procedure 500 is illustrated in FIG. 5. The process starts from the last frame ($y_{L-1}^{(i)}$) and goes backward in time to compute the signal error for each frame at the input of the softmax node ($\delta_n^{(i)}$). This error is propagated backwards through the unfolded network, for example, by using a Back Propagation Through Time (BPTT) process, such as disclosed in A. Graves and J. Schmidhuber, "Framewise phoneme classification with bidirectional LSTM and other neural network architectures", Neural Networks, vol. 18, pp. 602-610, 2005, which is incorporated herein by reference in its entirety.

In various embodiments, the backward pass includes the following steps. In step 510, at each frame, the Region of Target (ROT) is determined. ROT data 520 (e.g., an ROT table) is available according to ground truth labels. The soft target is computed in step 512 using the ROT information from step 510 and the network outputs. In step 514, the signal error is computed based on the network outputs and the estimated soft target. Finally, an adaptive learning rate algorithm is used to update the weights and biases of the network in step 516. The adaptive learning process (step 516) is configured to increase the training convergence rate by defining one or more methods updating the weights and biases of the network.

Referring to step 512, the process estimates the soft target according to the ROT and the network's output. In one embodiment, a goal is to cause the network to predict the correct class at least one time at any frame during the ROT (ROT frames include $n_r \leq$ frame index $< n_{r+N-1}$) and set the other frames of the ROT as the blank label. In one example (e.g., as illustrated in FIG. 1), "door-knocking" is the target class in the ROT and it is assumed to be the k-th node of the output layer. In this example, the ROT length of N and k-th node of the output layer should be close to one at least one frame during the ROT.

The signal error is computed to train the neural network in step 514. An adaptive rate algorithm is then applied to update the weights and biases of the neural network using the signal error (step 516). In one embodiment, to compute the signal error two cost functions are used: (i) a cross-entropy cost function for non-ROT frames; and (ii) the proposed many-or-one-detection (MOOD) cost function for ROT frames, which is designed to cause the network to spike one or many times during the event duration in accordance with the tunable hyperparameter.

The sigmoid function is used at the output layer to transform the logit to the probability of the class for each output node of the class. If the unnormalized output or logit before the sigmoid nonlinearity for m-th class at frame n is $z_n^{(m)}$, then the output probability of class m at frame n ($y_n^{(m)}$) is given using the sigmoid function:

$$y_n^{(m)} = \frac{1}{1 - e^{-z_n^{(m)}}} \quad (1)$$

In various embodiments, two cost functions are used for the classification depending on whether the frame is inside the ROT or not. For non-ROT frames (($n_0 \leq n < n_r$) or ($n_{r+N-1} \leq n < n_{L-1}$)), the Cross-Entropy (CE) cost function is used which is given below:

$$\text{Loss\_CE}_n^{(m)} = -\log(1 - y_n^{(m)}) \text{ if } n \text{ is in non-ROT},$$

$$\text{non-ROT} \rightarrow (n_0 \leq n < n_r) \text{ or } (n_{r+N-1} \leq n < n_{L-1}) \quad (2)$$

The signal error which is the derivative of the cost function with respect to the unnormalized output $z_n^{(m)}$ for non-ROT frames is calculated as follows:

$$\frac{\partial \text{Loss\_CE}_n^{(m)}}{\partial z_n^{(m)}} = \delta_n^{(m)} = -y_n^{(m)} \text{ if } n \text{ is in non-ROT} \quad (3)$$

$$\text{non-ROT} \rightarrow (n_0 \leq n < n_r) \text{ or } (n_{r+N-1} \leq n < n_{L-1})$$

where $y_n^{(m)}$ and $\delta_n^{(m)}$ are the output of network at frame n for m-th class and the signal error for the m-th class of the network output, respectively.

In some embodiments, the loss function for frames inside the ROT is designed so that the classifier spikes at least one time during the ROT frames to indicate the detection of the desired event in the ROT. For example, if the fire alarm sound occurs during the ROT, the classifier should be able to spike at least one time to indicate the detection of fire alarm class somewhere during the ROT. This loss function is called Many or One Detection (MOOD). To enforce the detection to be at least one time during the ROT, the complement rule is used which is given below.

$$\text{Probability(``not'' an event)} = 1 - \text{Probability(event)} \quad (4)$$

The complement rule is useful in the case where it is hard to compute the probability of an event, but it is relatively easy to compute the probability of "not" the event. For example, to compute the probability of tossing at least one head in 10 tosses of a coin, it would make sense to first perform the easier computation, the probability of "not-probability" or "not at least one head" or "no heads". The complement rule is then applied to find the probability of the event of interest:

$$\text{Probability(at least one head)} = 1 - \text{Probability(no heads)} \quad (5)$$

The MOOD loss function is designed using the complement rule and it is given below:

$$\text{Loss\_MOOD}_n^{(m)} = -\log(1 - P_{NOT}^{(m)}) \text{ if } n \text{ is in ROT},$$

$$\text{ROT} \rightarrow (n_r \leq n < n_{r+N-1}) \quad (6)$$

$$P_{NOT}^{(m)} = (1 - y_r^{(m)}) \times \ldots \times (1 - y_{r+N-1}^{(m)}) \quad (7)$$

The signal error for ROT frames using the proposed MOOD cost function is: (8)

$$\frac{\partial \text{Loss\_MOOD}_n^{(m)}}{\partial z_n^{(m)}} = \delta_n^{(m)} = t_n^{soft} - y_n^{(m)} \text{ if } n \text{ is in ROT}, \quad (9)$$

$$\text{ROT} \Rightarrow (n_r \leq n < n_{r+N-1})$$

$$t_n^{soft} = \frac{y_n^{(m)}}{1 - P_{Not}^{(m)}}$$

Where $t_n^{soft}$ is a soft target that is used in equation (8) to compute the signal error. As shown from equations (6) and (9), the computation of loss function or its derivative relies on the computation of $P_{NOT}^{(m)}$ which is the "not-probability" of the event.

Further refinements to the MOOD loss function are implemented to address the following two observations. As it is clear from equation (6), computing the MOOD loss includes the computation of the multiplication of N probability. If the number of frames in ROT (N) is large, the $P_{NOT}^{(m)}$ will be close to zero and so the total loss will be zero. This means that the above MOOD loss function may not work if the length of ROT is too small. The second observation is that the multiplication of N small numbers (less than 1) may result in underflow problem in a computing system.

To resolve these issues with the MOOD loss function, the "not-probability" in (6) is computed in some embodiments in the log domain and it is also averaged over the number of frames in the ROT. The geometric average is used to compute the "not-probability" as follows:

$$P_{NOT}^{(m)} = \exp\left(\frac{1}{N} \sum_{i=0}^{N-1} \log(1 - y_{r+i}^{(m)})\right) \quad (10)$$

$$t_n^{soft} = \frac{y_n^{(m)}}{1 - P_{Not}^{(m)}} \quad (11)$$

$$\frac{\partial \text{Loss\_MOOD}_n^{(m)}}{\partial z_n^{(m)}} = \delta_n^{(m)} = \frac{1}{N}(t_n^{soft} - y_n^{(m)}) \quad (12)$$

$$\text{Loss\_MOOD}_n^{(m)} = -\log(1 - P_{NOT}^{(m)}) \quad (13)$$

The above MOOD loss function will resolve the two problems provided that the ROT for training data for all classes have similar length. In other words, the length of ROT is balanced across the classes using all the training data. If the ROT length is imbalanced, the MOOD loss function in equation (11) will pay more attention to short ROTs and it will pay less attention to longer ROTs. One way to resolve this issue is to rescale the cost function based on length of ROT. So, in some embodiments, the new MOOD loss function design can be defined as follows:

$$P_{NOT}^{(m)} = \exp\left(\frac{1}{N} \sum_{i=0}^{N-1} \log(1 - y_{r+i}^{(m)})\right) \quad (14)$$

$$t_n^{soft} = \frac{y_n^{(m)}}{1 - P_{Not}^{(m)}} \quad (15)$$

$$\frac{\partial \text{Loss\_MOOD}_n^{(m)}}{\partial z_n^{(m)}} = \delta_n^{(m)} = \left(t_n^{soft} - y_n^{(m)}\right) \quad (16)$$

$$\text{Loss\_MOOD}_n^{(m)} = -N \log(1 - P_{NOT}^{(m)}) \quad (17)$$

Figure 8:
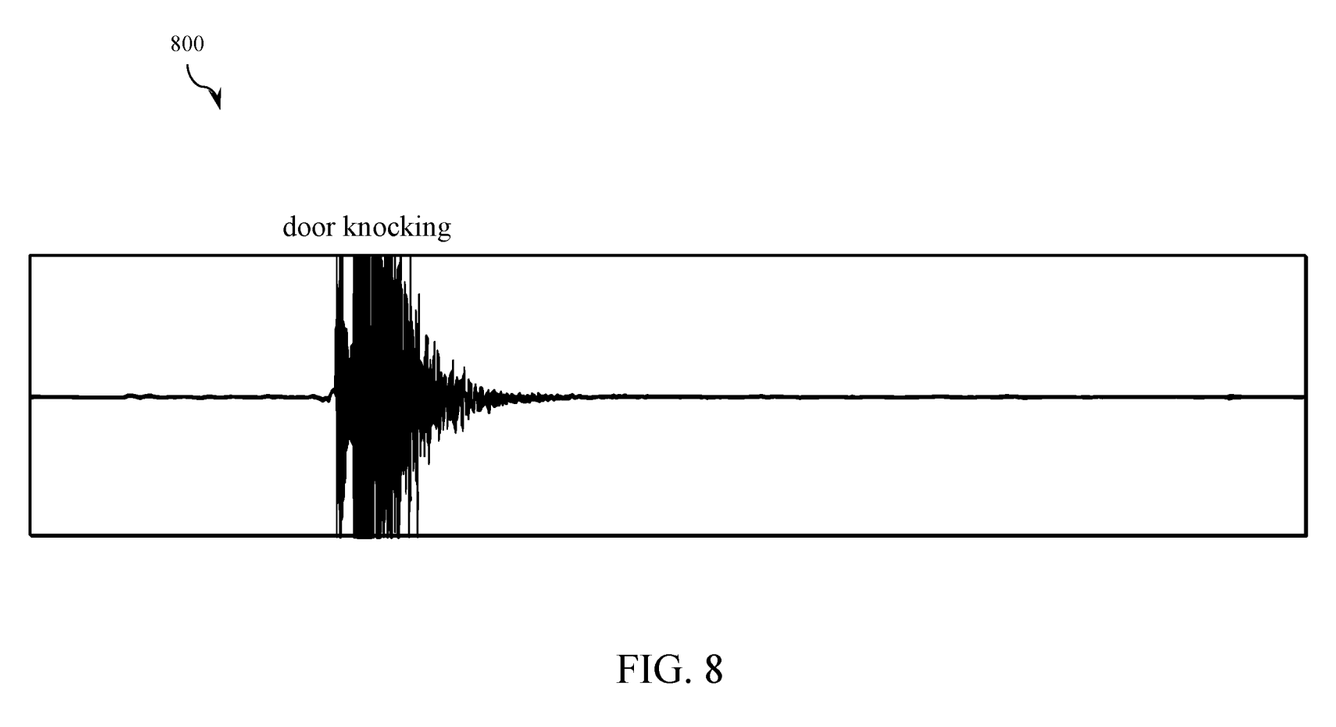
FIG. 8 is an example impulsive acoustic event, in accordance with one or more embodiments of the present disclosure.

It is observed that the above solution can still be improved. It is possible that the ROT length is large, and the event of interest is sparse across the ROT. For example, the ROT for an acoustic sample 800 in FIG. 8 may correspond to an impulsive acoustic event such as door knocking. Since the accurate starting and ending of the event is not available for labeling data, the whole duration of signal is the event of interest.

If equation (9) is used to compute the "not-probability" for this ROT, there will be many frames in ROT that correspond to silence and should not contribute to the computation of the "not-probability". In practice, this can be determined based on the threshold relative to the max probability in ROT. Below a new design of MOOD is proposed based on a MOOD hyperparameter tuning ($-1 \leq \gamma \leq 1$) which will lead a more general use cases for different applications. The MOOD hyperparameter is used to force the classifier to spike in different manner. In particular, higher values of MOOD hyperparameter will enforce the classifier to be closer to spike only one-time and lower values will enforce the classifier to be closer to spike all the time. So ($\gamma=1$) will force the classifier to have single spike while ($\gamma=-1$) will force the classifier to spike in ROT at all the frames.

Assume that the highest value of classifier output in ROT for class m is $y_{max}^{(m)}$ and the lowest value of classifier output in ROT for class m is $y_{min}^{(m)}$. This can be shown as follows:

$$y_{max}^{(m)} = \text{Max}_n(y_n^{(m)}) \text{ for } (n_r \leq n < n_{r+N-1}) \quad (18)$$

$$y_{max}^{(m)} = \text{Min}_n(y_n^{(m)}) \text{ for } (n_r \leq n < n_{r+N-1}) \quad (19)$$

$$\Delta = y_{max}^{(m)} - y_{min}^{(m)} \quad (20)$$

Now the MOOD threshold ($\theta$) will be computed based on the MOOD hyperparameter $\gamma$ $$\theta = \begin{cases} \log(1 - \gamma y_{max}^{(m)}), & \gamma \geq 0 \\ \log(1 - (y_{min}^{(m)} + (1+\gamma)\Delta)), & \gamma < 0 \end{cases} \quad (21)$$

We define the MOOD set $\emptyset$ as the set of frames in the ROT that can contribute to the computation of the "not-probability":

$$\emptyset = \{k : n_r \leq k < n_{r+N-1} \text{ and } \log(1 - y_k^{(m)}) \leq \theta\} \text{ if } \gamma \geq 0 \quad (22)$$

$$\emptyset = \{k : n_r \leq k < n_{r+N-1} \text{ and } \log(1 - y_k^{(m)}) \geq \theta\} \text{ if } \gamma < 0 \quad (23)$$

If the length of MOOD set $\emptyset$ is $L_\emptyset$, the modified MOOD cost function can be computed as follows:

$$P_{NOT}^{(m)} = \exp\left(\frac{1}{L_\emptyset} \sum_{k \in \emptyset} \log(1 - y_k^{(m)})\right) \quad (24)$$

$$t_n^{soft} = \text{Min}\left(\text{Max}\left(\frac{y_n^{(m)}}{1 - P_{Not}^{(m)}}, 0\right), 1\right) \quad (25)$$

$$\frac{\partial \text{Loss\_MOOD}_n^{(m)}}{\partial z_n^{(m)}} = \delta_n^{(m)} = \left(t_n^{soft} - y_n^{(m)}\right) \quad (26)$$

$$\text{Loss\_MOOD}_n^{(m)} = L_\emptyset \log(1 - P_{NOT}^{(m)}) \quad (27)$$

For an acoustic event classification application, each frame belongs to one of M classes of acoustic events. Assume $t_n^{(m)}$ is the target value of the network at frame n for m-th output node of the network, then this value is one when frame n belongs to m-th class of acoustic events and it would be zero for all other nodes. For frame-wise training, the cross-entropy cost function may be used for training non-ROT frames and a many-or-one detection cost function may be used ROT frames for the target node, as described herein. In some embodiments, the MOOD cost function for ROT frames is designed to cause the network to spike one or many times during the event duration. The MOOD cost function may be based on the complement rule, which defines a rule for "not" events. The complement rule is used herein to classify acoustic events in cases where it is difficult to compute the probability of the acoustic event, but it is relatively easy to compute the probability of "not" the event.

In various embodiments, in order to train the network and update the weights and biases, the signal error is computed for the non-ROT frames and ROT-frames. In various embodiments, frame-wise training may force the neural network to predict the acoustic event in the entire duration of the acoustic event for all frames. It is desirable to train the network to predict an acoustic event after it sees the entire duration of the acoustic event including the transitions, because the acoustic event have similar temporal-spectral characteristic at the initial parts but unique characteristic when considering the entire duration of the acoustic event. As a result, it is often desirable to force the network to predict an acoustic event almost at the end of it.

To compute the update of the weights and biases, the signal errors for the non-ROT and ROT frames as discussed above is computed and then propagated backwards through the unfolded network from the output layer to the input layer. The algorithm to compute the signal error of each frame is based on the Region of Target (ROT). This region may include all the frames corresponding to the target label of that frame plus some additional frames near the two boundaries (on the left and right) sufficient to include the transitions.

The disclosed system is targeted to detect the occurrence of an event which can either be a repetitive event (e.g., a fire alarm or door knock) or non-repetitive event (e.g., glass breaking or door slamming). This system can also be used for speech detection to improve the performance of far-field speech enhancement techniques in high noise conditions. In this application, the system will be used to identify the speech event in a continuous signal to help the speech enhanced methods to effectively reduce the noise while having minimal artifacts during speech. The speech detection model trained using the systems and methods disclosed herein can also help to reduce the false alarms for a keyword spotting solution. To this end the speech detection is either trained separately or as a combined solution to model the trigger keyword and speech altogether. This will help to produce a robust solution for keyword spotting to reject the noise especially those that are impulsive and have a structure close to the keyword of the interest.

The MOOD loss function disclosed herein is a general solution that may be implemented in a variety of system designs in different areas of signal processing, including speech and image processing. In general, any classification problem can utilize this cost function and depending on the requirement or training data labeling, the hyperparameter tuning can make it better fit for the use-cases and the application. For example, a system to detect a person or persons in images generated by a security camera can be configured using the MOOD cost function when the MOOD hyperparameter is set to a value close to zero. If the system requirement is to detect and localize a person in the image (e.g., in embodiments where the number of detected persons is important and not just the existence of person or persons), then the MOOD cost function can be used with MOOD hyperparameter close to one. In speech processing applications, the MOOD cost function configured with a MOOD hyperparameter close to one can be used for keyword spotting application while setting the hyperparameter close to minus one can be used for speech activity detection application for speech enhancement. As a result, the new cost function with a hyperparameter disclosed herein allows a training system to be used to fit better it towards different applications.

The solutions disclosed herein are generally applicable to event classification systems and methods including acoustic classifiers, image classifiers, and other data event classifiers. The improved MOOD cost function with hyperparameter provides a robust solution for different applications. This feature can help to improve the performance of current classifiers for keyword spotting, voice activity solution and acoustic event detection, for example, to improve its robustness against noise.

Figure 6:
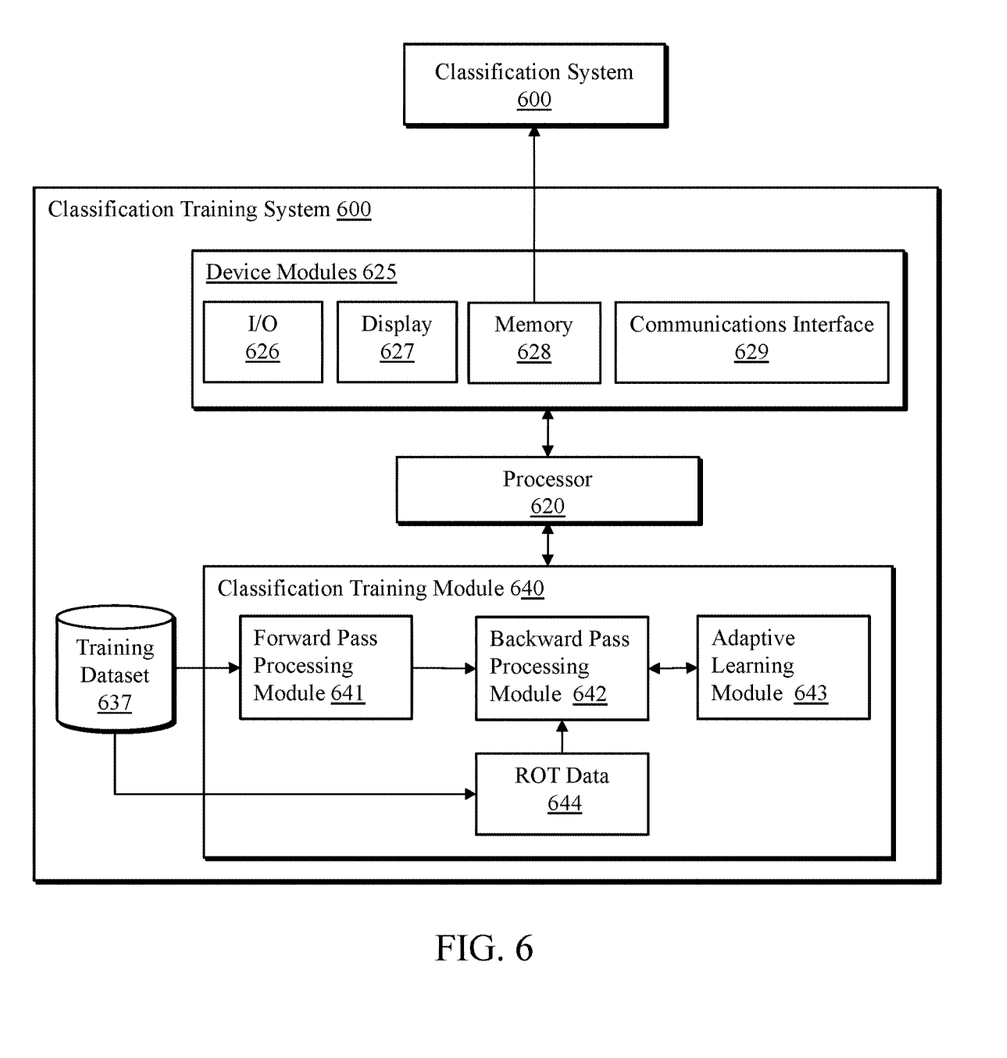
FIG. 6 is a block diagram illustrating an example detection and classification training system, in accordance with one or more embodiments of the present disclosure.

FIG. 6 illustrates an example classification training system 600 of some embodiments that performs at least part of the training process described above. The classification training system 600 is programmed to perform the training processes described above and includes the training dataset 637 which contains the pre-segmented labeled training data including keywords with labeled start and end points. Training dataset 637 is connected to a classification training module 640, which includes a ROT module 644. The ROT module 644 (e.g., an ROT table) is built using the information about the segmented training data provided by training dataset 637. The classification training module 640 also includes a forward pass processing module 641 programmed to perform the forward pass process described herein and a backward pass processing module 642 programmed to perform the backward pass processes described herein, including use of the MOOD cost function with hyperparameter. In some embodiments, the classification training module 640 may be configured to train a start detector neural network and an end detector neural network for detecting a Region of Target in an input stream, and a multi-class classification system neural network for classifying acoustic events within a detected Region of Target.

The adaptive learning module 643 includes one or more adaptive learning algorithms that can be used by the backward pass processing module to update the weights and biases of a neural network, such as a recurrent neural network. In some of these embodiments, the classification training module 640 can iteratively perform the training processes using different training data to continuously improve and update the neural network. The classification training module 640 can store the updated neural network in the memory 628.

The classification training system 600 may further include a processor 620, which can include central processing unit, a micro-controller, a digital signal processor (DSP), or other processing components, for controlling and facilitating the operations of the classification training system 600, including controlling communications with internal and external devices.

The classification training system 600 further includes one or more communication channels such as a bus for facilitating communication of data between various components of the classification system 600. Components may include device modules 625 for providing device operation and functionality, which may include input/output components 626 such as a touch screen, keyboard, mouse, etc., a display 627 such as a monitor, a memory 628 such as RAM, solid state drive, disk drive, database, etc., and a communications interface 629. In some embodiments, the communications interface 629 may include a network interface (e.g., Ethernet interface) or a wireless transceiver for enabling the classification training system 600 to communicate with remote devices over a network. In operation, the neural network is trained by the classification training system 600 offline and the trained model including the weights and biases of the neural network may be stored in classification system 700 for online classification of audio data.

Figure 7:
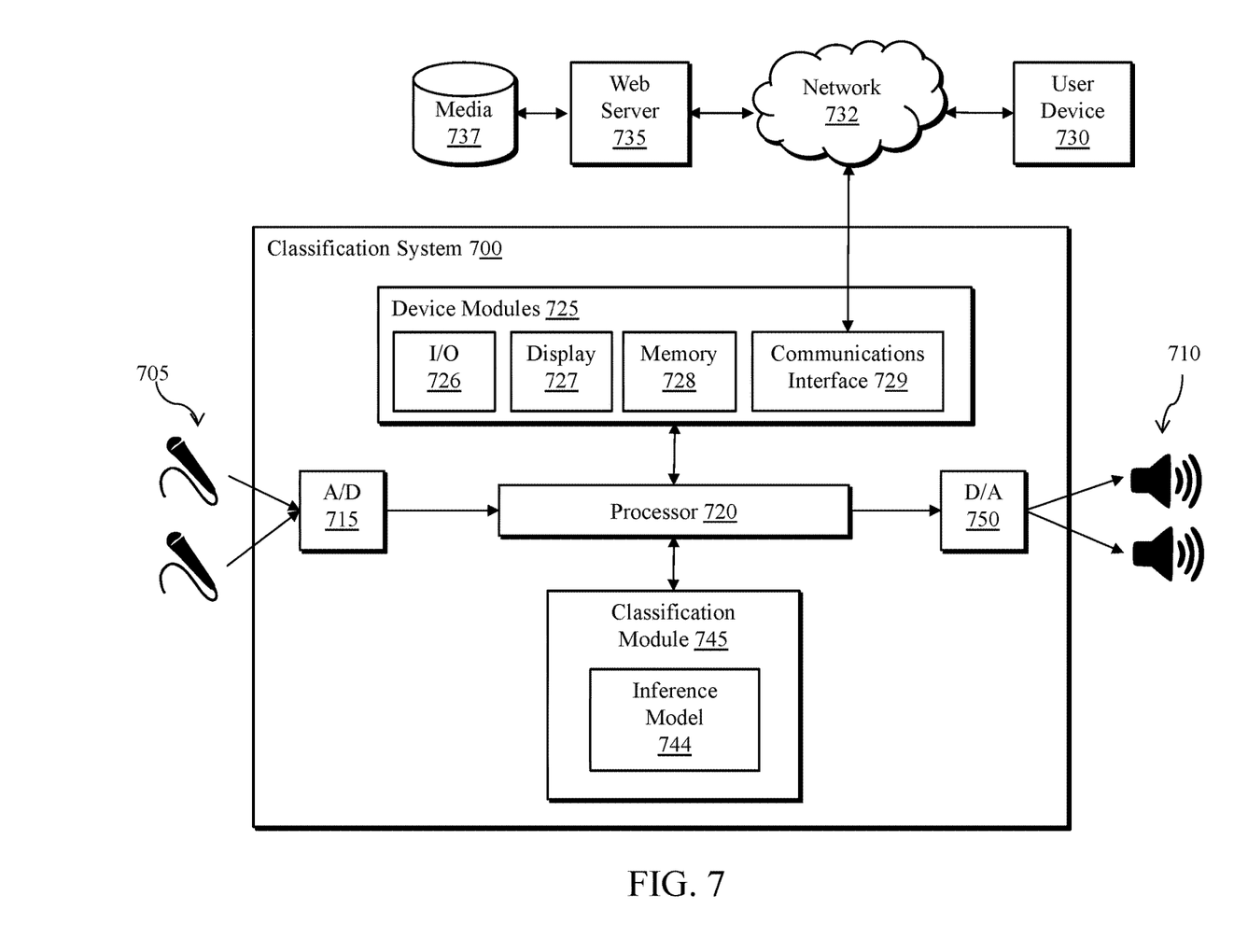
FIG. 7 is a block diagram illustrating an example detection and classification system, in accordance with one or more embodiments of the present disclosure.

Referring to FIG. 7, an example classification system 700 of some embodiments is illustrated. The classification system 700 may be implemented as a mobile device, such as a smart phone or a laptop computer, a television or display monitor, a display computer, a smart speaker, a voice activated assistant, a computer server, an automobile, a speech recognition system, or any other device that provides audio keywords (e.g., commands) recognition capability. The classification system 700 is communicatively coupled with one or more audio inputting devices 705 such as a microphone or microphone array and, optionally, also with one or more audio outputting devices 710 such as a loudspeaker.

In some embodiments, the classification system 700 can include an analog-to-digital converter 715 that converts the analog audio signals received from the audio inputting devices 705 into digital audio signals and sends the digital audio signals to processor 720, which can be a central processing unit, a micro-controller, a digital signal processor (DSP), or other processing components, for controlling and facilitating the operations of the classification system 700, including controlling communications with internal and external devices. The classification system 700 may also include a digital-to-analog converter 750 that converts digital audio signals generated by the different modules and components of the classification system 700 to analog signals before transmitting the analog signals to the one or more audio outputting devices 710.

The classification system 700 includes one or more communication channels such as a bus for facilitating communication of data between various components of the classification system 700. Components may include device modules 725 for providing device operation and functionality, which may include input/output components 726 such as a touch screen, keyboard, mouse, etc., a display 727 such as a monitor, a memory 728 such as RAM, solid state drive, disk drive, database, etc., and a communications interface 729. In some embodiments, the communications interface 729 may include a network interface (e.g., Ethernet interface) or a wireless transceiver for enabling the classification system to communicate with remote devices over a network 732. Remote devices may include user devices 730 (e.g., household appliances, other user electronics, etc.), or a web server 735 that is communicatively coupled with a media storage 737.

The classification system 700 also includes a classification module 745 programmed to implement the trained neural network, which is trained and/or updated by the classification training system 700. The classification module 745 includes a trained inference model 744 for classifying audio input. In one embodiment, the trained inference model 744 is programmed to perform detection and classification on audio input data received from audio inputting devices 705. In various embodiments, the classification module 745 may include other classification and analysis components, including parts of an automatic speech recognition module such as language processing providing voice command processing, an image search and classification system, an object detection system, or other application configured for use with the trained neural network as described herein.

The trained inference model 744 can generate a response in real-time or close to real-time of the audio input data. In some embodiments, the classification module 745 can be programmed to output the response as an audio sound via the digital-to-analog converter 750 and the audio outputting devices 710. Instead of, or in addition to, producing an audio signal, the classification module 745 can be programmed to send a signal to an external device (e.g., to initiate an action or a transaction through the external device) based on the generated response. For example, the classification system 700 can be part of or communicatively coupled with a smart home system, and send a signal to a user device (e.g., a household appliance) via a network 732 (e.g., a local area network within the user's residence) based on the generated response (e.g., sending a signal to turn on the television based on the response generated by an audio input from the user). In another example, the classification system 700 can initiate a transaction with a web server 735 over the Internet based on the generated response (e.g., sending a signal to the web server 735 to purchase a movie stored in media storage 737 based on the response generated by an audio input from the user). The classification system disclosed herein is not limited to processing audio signals but can be used to train a neural network to process different input (e.g., image data, video data, etc.) as well.

In various embodiments, the trained inference model 744 comprises a plurality trained neural networks that may include a start detector neural network and an end detector neural network for detecting a Region of Target in an input stream, and a multi-class classification system neural network for classifying acoustic events within a detected Region of Target. In some embodiments, the trained inference model 744 is trained using the tunable MOOD cost function as described herein.

In various embodiments, the classification system of FIG. 7 is configured to provide classifications of individual sound events relating to an audio context or scene. The classification module 745, may be trained to generate a multi-class description of an audio signal which may be received in real time from an audio input device (e.g., microphone 705) and/or an audio file or other audio data stored on a device. For example, the classification system may be used to tag videos including audio based on an associated audio signal. The classification may provide different event classifications such as a classification of audio content from a holiday recording that includes sound events indicating a location (e.g., "beach" context), other people (e.g., "children"), weather events (e.g., rain, thunder), pets (e.g., a dog barking). In some embodiments, a first level of classification may include direct classification of an acoustic event, and context classification may be determined from the classified acoustic events.

These solutions described herein may be used for automatic speech recognition (ASR) to detect the phoneme or words. The disclosed system may be tuned by setting the hyperparameter to detect speech units and cause the network to identify the unit of speech in a ROT. This will allow the network to spike at least one time during the ROT rather than causing it to spike all the time. Similarly, the proposed solution may be used for natural language processing to learn the context of a word or be tuned for other tasks as desired.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for training an event classifier comprising:
receiving a training dataset including a plurality of input samples having segmented labeled data;
computing a classifier output for each input sample of the training dataset in a forward pass through the classifier;
tuning a many-or-one detection (MOOD) cost function using a hyperparameter in accordance with at least one event classifier goal;
updating weights and biases of the classifier through a backward pass, including determining whether an input frame is in a Region of Target (ROT), and estimating the update of the weights and the biases of the classifier;

wherein the classifier is trained using the tuned MOOD cost function to cause the classifier to spike at least one time during a duration of the event.

2. The method of claim 1, wherein the classifier is trained for phoneme recognition using a multi-class classification; wherein updating weights and biases through the backward pass through the classifier further comprises computing a signal error for all output nodes using a cross-entropy cost function for non-ROT regions; and wherein the classifier is further trained to compute the MOOD cost function for all the frames of the ROT.

3. The method of claim 1, wherein the hyperparameter is tuned to enforce the classifier to generate a predetermined classification result.

4. The method of claim 1, wherein the hyperparameter is tuned to train the classifier to generate a single-detection in the ROT, generate detections in all of the ROT, and/or generate a plurality of detections in ROT.

5. The method of claim 1, further comprising finding ROT information, including a beginning and length of the ROT, and scaling the MOOD cost function based at least in part on the length of the ROT.

6. The method of claim 1, wherein adaptively learning to improve a convergence rate comprises determining a momentum for the weights and biases of an output layer, and computing root mean square of gradients for weights and biases not in the output layer.

7. The method of claim 1, wherein the classifier is trained for acoustic event detection, and wherein the classifier is trained to generate a spike when the acoustic event is detected.

8. The method of claim 7, further comprising:
calculating a signal output error for each classifier output based on the determination of whether the input frame is in the ROT; and
updating the weights and biases during a backward pass based on the calculated signal output error.

9. The method of claim 8, wherein updating the weights and biases during the backward pass further comprises applying a cross-entropy cost function if the input frame is not in the ROT.

10. The method of claim 9, wherein calculating the signal output error for each output comprises:
obtaining ROT information for the input frame, including a length and beginning of the ROT;
computing a soft target value using the ROT information and the MOOD cost function, which is based at least in part on a complement rule; and
computing the signal output error using the computed soft target value and classifier output value;
wherein the MOOD cost function is computed in a log domain and is averaged over a number of frames in the ROT.

11. A classification training system comprising:
a neural network configured to classify audio input data;
a training dataset providing segmented labeled audio training examples; and
a classification training module configured to train the neural network using the segmented labeled training data, the classification training module comprising a forward pass processing module, and a backward pass processing module;
wherein the forward pass processing module is configured to train the neural network by generating neural network outputs for the training data using a current value of weights and biases for the neural network;
wherein the backward pass processing module is configured to train the neural network by updating the weights and biases by passing backward through generated neural network outputs, determining whether an input frame is in a Region of Target (ROT), tuning a many-or-one detection (MOOD) cost function for ROT frames, applying a MOOD cost function for the ROT frames; and adaptively learning to improve a convergence rate of the neural network.

12. The training system of claim 11, wherein the weights and biases are updated by computing a signal error for all output nodes using a cross-entropy cost function for non-ROT regions; and wherein the weights and biases are updated by improving the convergence rate of the neural network using an adaptive learning rate algorithm.

13. The training system of claim 12, further comprising a memory storing an ROT table; and wherein the backward pass module comprises an ROT information module configured to find a beginning and a length of the ROT using a ROT table.

14. The training system of claim 13, wherein the backward pass module comprises a soft target module configured to compute a soft target for all the frames of the ROT.

15. The training system of claim 14, wherein the soft target module is further configured to compute the signal error using the computed soft target value and network output value.

16. The training system of claim 11, further configured to tune a hyperparameter to enforce the classifier to generate a predetermined classification result comprising generating a single-detection in the ROT, generating detections in all of the ROT, and/or generating a plurality of detections in ROT.

17. The training system of claim 11, wherein the classification training module is configured to train for audio event recognition using a multi-class classification.

18. The training system of claim 11, wherein the classification training module is configured to train for keyword spotting.

19. The training system of claim 11, wherein two cost functions are used to compute a signal error, wherein the two cost functions comprise a cross-entropy cost function for non-ROT frames, and the MOOD cost function for ROT frames.

20. The training system of claim 11, wherein adaptively learning to improve a convergence rate of the neural network comprises determining a momentum for the weights and biases of an output layer and computing a root mean square of gradients for the weights and biases.

* * * * *